United States Patent [19]

Jeanneret

[11] Patent Number: 5,432,418
[45] Date of Patent: Jul. 11, 1995

[54] MOTOR SYSTEM FOR AN ELECTRIC TYPE VEHICLE

[75] Inventor: Rene Jeanneret, Merzlingen, Switzerland

[73] Assignee: SMH Management Services AG, Biel, Switzerland

[21] Appl. No.: 83,520

[22] Filed: Jun. 30, 1993

[30] Foreign Application Priority Data

Jul. 1, 1992 [CH] Switzerland ............ 02072/92

[51] Int. Cl.6 ................................................ H02P 5/40
[52] U.S. Cl. ..................................... 318/34; 318/139; 318/52
[58] Field of Search ............... 318/34, 52, 138, 139, 318/148, 168, 67, 68, 375, 379, 801, 258, 254, 723; 180/6.28, 6.5, 65.2–65.8, 6.48, 2.1

[56] References Cited

U.S. PATENT DOCUMENTS

| 3,568,022 | 12/1967 | Stuttgart | 318/139 |
|---|---|---|---|
| 3,577,050 | 5/1971 | Ringland | 318/139 |
| 3,688,171 | 8/1972 | Salihi et al. | 318/376 |
| 3,720,863 | 3/1973 | Ringland et al. | 318/52 |
| 3,731,169 | 5/1973 | Burgholte et al. | 318/139 |
| 3,756,335 | 9/1973 | Eisele et al. | 318/52 |
| 4,030,006 | 6/1977 | Elger | 318/237 |
| 4,188,569 | 2/1980 | Campbell | 318/139 |
| 4,189,667 | 2/1980 | Boxer | 318/338 |
| 4,196,377 | 4/1980 | Boxer | 318/269 |
| 4,347,467 | 8/1982 | Boxer | 318/317 |
| 4,351,405 | 9/1982 | Fields et al. | 318/139 |
| 4,363,999 | 12/1982 | Preikschat | 318/53 |
| 4,496,888 | 1/1985 | Campbell | 318/284 |
| 5,103,923 | 4/1992 | Johnston et al. | 318/148 |
| 5,182,508 | 1/1993 | Schauder | 318/801 |
| 5,280,223 | 1/1994 | Grabowski et al. | 318/139 |

FOREIGN PATENT DOCUMENTS

| 0085394 | 1/1983 | European Pat. Off. . |
| 3714404 | 11/1988 | Germany . |
| 4011291 | 10/1991 | Germany . |

Primary Examiner—Philip Ip
Attorney, Agent, or Firm—Griffin, Butler Whisenhunt & Kurtossy

[57] ABSTRACT

The invention concerns a motor system of an electric type vehicle, comprising at least two asynchronous electric motors (M1, M2) supplied in parallel by a central electric supply. This central electric supply is controlled by a control device supplying thereto a first control signal (SCF) determining the value of the supply frequency (FAL) and a second control signal (SCA) determining the value of the supply amplitude (UAL) of the supply voltage. These first and second control signals are regulated essentially in dependence upon a signal (SMI) which is a measurement of the principal supply current (IAL), an instruction signal (SCS) and a signal (SFMX) representing the maximum value of the rotational frequency of the rotors (R2, R2) of said motors.

16 Claims, 6 Drawing Sheets

MOTOR SYSTEM FOR AN ELECTRIC TYPE VEHICLE

The present invention concerns a motor system of an electric type vehicle. More particularly, the present invention concerns a motor system for an electric vehicle for which there is a defined right-hand side and left-hand side relative to an axis of travel of the vehicle, comprising at least one first asynchronous electric motor for driving a first wheel situated on the right-hand side of the vehicle, and a second asynchronous electric motor for driving a second wheel situated on the left-hand side of the vehicle.

A motor system of an electric vehicle comprising at least one motor driving a wheel situated on the right-hand side of the vehicle and another motor driving a wheel situated on the left-hand side of the vehicle is known from DE-4 011 291. The supply to each of these motors is controlled by a separate secondary control defining an instruction value for either the power supplied to the respective wheel or the angular speed of this wheel. The secondary controls are then connected to a principal control whose purpose is to ensure homogeneity in the control of the various motors so that each motor performs in a coherent manner relative to the performance of the other motors as a function of the vehicle's driving conditions.

The above-described motor system has several drawbacks. Firstly, the various secondary controls and the central control provided in this motor system are expensive. Secondly, such a motor system in which a central control is required to send specific controls to each of the secondary controls for controlling supply of one motor involves substantial risks of generating inappropriate on-the-road driving behaviour in several possible situations that could not be integrated into the central control or into the secondary controls in view of their complexity. The multiple controls of this system form filters which, when one motor is momentarily in an extreme situation, substantially diminish the possibility for consequential instantaneous reaction of the other motors so as to ensure proper road-handling of the vehicle. Such a motor system thus has a limited flexibility and a low instantaneous reaction capacity, which makes it inefficient or inappropriate in several driving situations that can arise.

An aim of the present invention is to palliate the drawbacks of the hereinbefore described motor system by proposing a motor system having a great flexibility of use and having very good on-the-road driving performances. Another aim of the present invention is to provide a motor system which ensures a very high energy efficiency and optimum use of the motors.

The present invention thus provides a motor system for an electric type vehicle comprising at least two asynchronous electric motors, each of these motors being coupled to a respective single wheel of said vehicle and comprising:

a stator winding arranged to produce a magnetic field turning at a stator frequency in response to an AC supply current supplied to said stator winding by electric supply means at an AC voltage defining a supply frequency;

a rotor magnetically coupled to said stator winding, this rotor rotating at a rotor frequency whose value depends on the value of said turning magnetic field; the motor system being characterized in that said rotor frequency of each of said motors is measured by first measuring means and is supplied to electronic measuring-signal processing means forming part of said motor system, this electronic processing means issuing at a first output, connected to a first input of a control device, a frequency signal which represents, among said measured rotor frequencies, the maximum rotor frequency, said control device supplying to said electric supply means a first control signal in response to said frequency signal applied to this control signal, said first control signal determining, for each of said motors, a common value for said supply frequency, this value of said supply frequency defining for said stator frequency of each of said motors a common resulting value, said control device being arranged so that said resulting value is greater than the value of said frequency signal having served to regulate said resulting value when said motor system is activated in a drive mode.

These characteristics result in a motor system comprising a single common arrangement for controlling the electric supply means and serving to supply at least two asynchronous electric motors, each of these two motors being coupled to a respective wheel or to transmission means of the vehicle equipped with this motor system. Then, when the drive mode of this motor system is activated, all of said motors are operated in a drive mode, because whatever may be the driving conditions, for example going around bends or along a road having an uneven surface, the slip of each of said asynchronous electric motors is always positive.

Moreover, if one of said wheels accelerates due to a loss of adherence, the torque exerted on that wheel drops because the slip is instantaneously reduced, in view of the reaction time interval necessary for the rotor frequency measuring means, for the control device and for the electric supply means. In the latter case, the wheel immediately loses speed and returns to a situation where it adheres to the ground. A self-regulation of the conditions for adherence of all of the vehicle wheels coupled to respective motors of the motor system is thus observed as long as at least one of said wheels fulfills the aforesaid condition of adherence. It will also be noted that when one of said wheels instantaneously loses adherence, its frequency will hardly exceed said frequency of rotation of the turning magnetic field because beyond this frequency of rotation, the motor coupled to said wheel goes into a braking mode.

According to another characteristic of the invention, said control device is arranged so that, when a braking mode is activated, said resulting value of the stator frequency of each motor is less than the value of said frequency signal having served to regulate said resulting value.

This characteristic results in a complementary braking mode having the same performances as said drive mode and being controlled by the same control device. Regulation of the resulting value of the stator frequency in the braking mode by means of the maximum rotor frequency leads to a well-performing braking device, preventing locking of the wheels. If a wheel goes out of control during braking, its speed can only drop and hence the braking torque applied to this wheel drops. As a consequence, the wheel once again adheres and resumes its normal rolling speed. Hence, the maximum braking torque is always supplied to wheels that adhere well to the ground. It will be noted that at the end of braking, it is of course arranged that the first frequency control signal always corresponds to a positive frequency.

According to a particular embodiment of the invention, a motor system is provided with solely two asynchronous electric motors, these two motors being coupled with respective wheels situated on opposite sides of the vehicle. It is thus possible to provide a front wheel drive vehicle or a rear wheel drive vehicle.

According to another particular embodiment of the invention, each wheel of the vehicle equipped with the motor system is coupled with a respective motor.

According to this particular embodiment, it is thus possible to provide an all-wheel drive vehicle. It is noted here that it is possible to make the motors at the front of the vehicle of different dimensions to the motors at the rear of the vehicle so that the mechanical power delivered by the front motors is greater than or less than the mechanical power delivered by the rear motors.

According to another particular characteristic of the invention, all of the motors of said motor system are connected to a common central electric supply which supplies the motors in parallel with a principal AC supply current.

This particular characteristic results in a substantial reduction of the cost of the motor system according to the invention. Moreover, this solution also provides electrically related advantages, particularly when the source of energy is formed by an electric battery.

According to other characteristics of the motor system according to the invention, the amplitude of said supply voltage is determined by the value of a second control signal, the first control signal being applied to a first input of said electric supply means by the first regulation means for regulating the supply frequency, the second control signal being applied to a second input of said electric supply means by second regulation means for regulating the supply amplitude, said first and second regulation means being arranged so that, for each value of said stator frequency, said supply amplitude is able to vary in dependence upon a regulation signal between a minimum value and a maximum value defined for each value of the stator frequency, said maximum values together defining a voltage limit curve, the supply frequency being adjusted so that, for each value of said stator frequency, the difference in the frequency of rotation between said stator frequency and said maximum rotor frequency is maintained substantially constant as long as said supply amplitude has a value less than the defined maximum value for this value of the stator frequency, the first and second regulation means being arranged so that the absolute value of said frequency difference can be increased in dependence upon said regulation signal when, for any value of the stator frequency, said supply amplitude has a value equal to said defined maximum value for said value of the stator frequency.

These characteristics result in a motor system wherein the supply amplitude of the supply voltage is able to vary independently of the supply frequency, which leads to a very broad domain of possible operating conditions for the motors used. It is possible, for a given maximum rotor frequency, to vary the torque supplied by the motors to the vehicle by varying firstly the supply amplitude of the supply voltage and secondly the value of the stator frequency and hence of the slip.

Thus, it is possible to obtain a practically optimum use of the motor system according to the invention over an entire operating range. It is observed that optimum efficiency is obtained for a substantially constant frequency difference between a motor's stator frequency and rotor frequency, whatever may be the rotor frequency and the supply voltage amplitude and as long as the latter generates a magnetic flux through the rotor winding that is sufficiently remote from the saturation flux of this motor. The value of said frequency difference providing optimum efficiency is determined in dependence upon the characteristics of the used asynchronous motors.

These characteristics also lead to the possibility of increasing the value of the power supplied to the motors up to a threshold value at which the motors operate at their maximum capacity. Given that it is possible to vary the supply amplitude in dependence upon the required torque, the voltage limit curve may be situated relatively close to magnetic saturation of the motors and, by increasing the slip, the torque is increased as long as the value of the slip is situated in the motors' working range.

According to another particular characteristic of the invention, the motor system comprises a device for measuring the principal supply current supplied by the electric supply means to the motors of this motor system. This measuring device transmits a signal representing either the amplitude or the intensity of the principal supply current to a unit producing the regulation signal of this motor system. The regulation signal is so determined that the value of the signal measuring the principal supply current is equal to the value of an instruction signal also supplied to the unit producing the regulation signal.

This particular characteristic results in a motor system wherein the principal supply current is regulated in dependence upon an instruction signal coming for instance from a drive control or from a braking control of the vehicle equipped with the motor system. The total torque supplied on the motors' shafts is thus controlled by the instruction signal, this total torque depending upon the principal supply current supplied to said motor.

According to a particular embodiment of the invention, the motor system according to the invention may be used in a drive mode and in a braking mode. To do this, there is provided a drive control and a braking control respectively supplying a drive signal and a braking signal to a selection device. This selection device is arranged to supply at its output said instruction signal, with a value corresponding to said drive signal when the braking signal has a non-braking value and to that of the braking signal when the value of the latter is different from the non-braking value.

This particular embodiment of the invention results in a motor system wherein a drive mode and a braking mode of the associated vehicle can be activated. Moreover, the braking control always has precedence over the drive control, which ensures safe driving in the case of simultaneous contradictory commands.

The present invention will be better understood with the help of the following description, made with reference to the accompanying drawings which are given solely by way of example and in which.

Referring to FIGS. 1 to 6 a first embodiment of motor system according to the invention will hereinafter be described.

Figure 1:
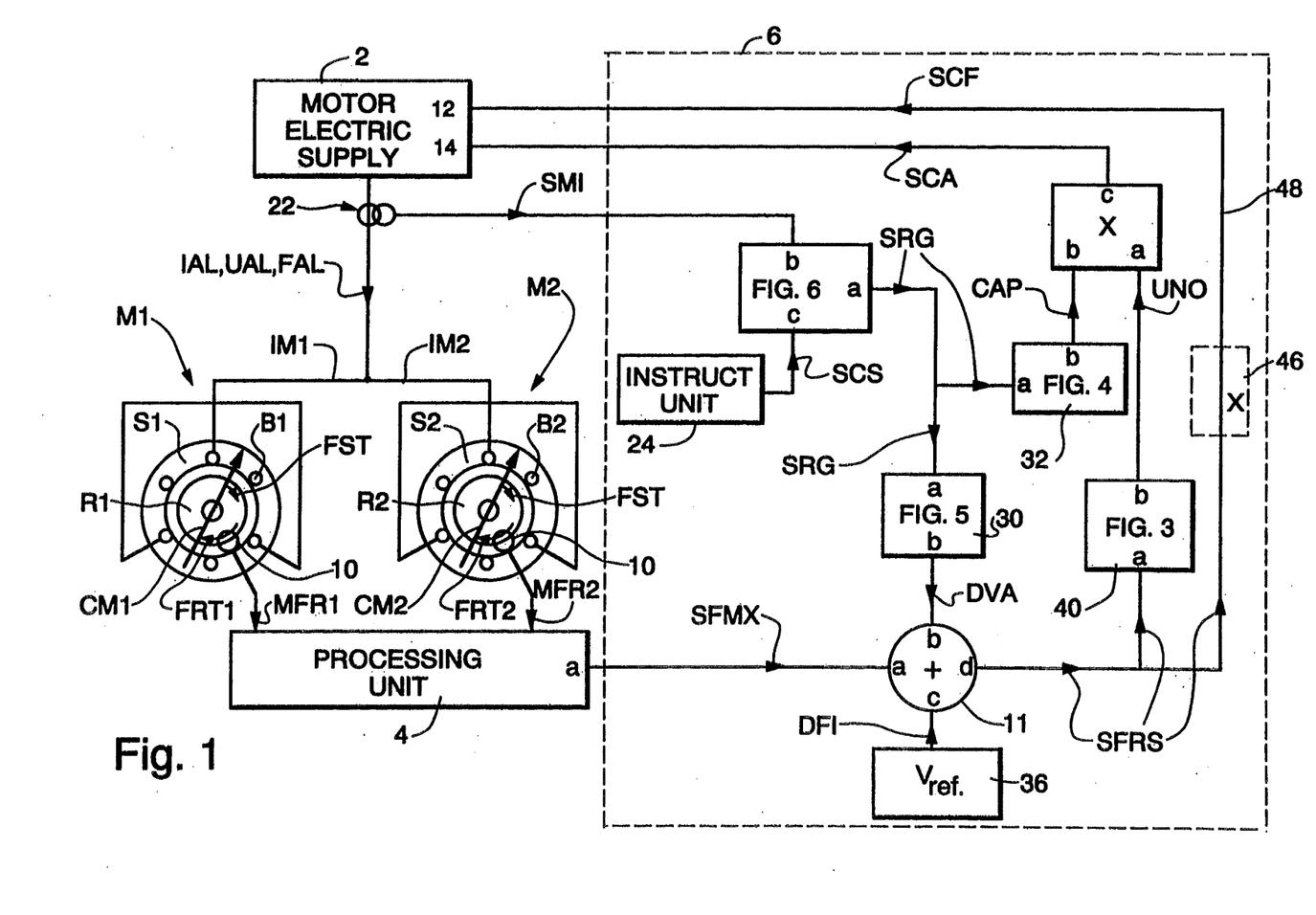
FIG. 1 schematically shows a first embodiment of a motor system according to the invention, which comprises two asynchronous electric motors supplied in parallel.

In FIG. 1, the motor system according to the invention comprises electric supply means 2, hereinafter also referred to as central electric supply, supplying a first asynchronous electric motor M1 and a second asynchronous electric motor M2 in parallel.

Each of motors M1, M2 includes a stator S1, S2 comprising a stator winding B1, B2, and a rotor R1, R2 having a rotor winding forming a closed loop. The central electric supply 2 produces a principal polyphase AC electric supply current IAL at a supply voltage having a supply amplitude UAL and a supply frequency FAL. Supply current IAL is formed by the sum of the supply current IM1 of the first motor and the supply current IM2 of the second motor.

The stator winding B1, B2 is arranged so that said supply current IM1, IM2 of the respective motor flowing in this stator winding generates a turning magnetic field CM1, CM2 at a stator frequency FST in the region of the respective rotor, which has a rotor frequency of rotation FRT1, FRT2 that depends on the turning magnetic flux and the load.

Each of motors M1, M2 is coupled to a single respective wheel of the vehicle of this first embodiment of motor system of the invention. The frequency of rotation of each of these wheels is a linear function of the rotor frequency FRT1, FRT2 of the respective rotor R1, R2.

Operation of an asynchronous electric motor will hereinafter be briefly described. When the rotor R1, R2 has a frequency of rotation FRT1, FRT2 which is different from the frequency of rotation FST of the turning magnetic field CM1, CM2, the flux of this turning magnetic field passing through the rotor winding induces in this winding an induced voltage generating an induced electric current therein. In this instance, the rotor is acted upon by an electromagnetic force resulting from the coupling between the turning magnetic field CM1, CM2 and the electric current induced in the rotor winding, which generates a torque on the output shaft of motor M1, M2. For such an asynchronous motor, a slip S can be defined, equal to the relative frequency difference between the frequency of rotation of the turning magnetic field and the frequency of rotation of the rotor.

For a given stator frequency FST and a given supply voltage amplitude, an increase of the supply current is observed when the slip S increases, as well as an increase of the torque when the slip varies between a zero value and a threshold value at which the maximum torque is reached. The range of values of the slip comprised between the zero value and the threshold value defines an operating range for the motor for the given stator frequency FST and the given supply amplitude.

Furthermore, for a stator frequency FST and a given slip S, an increase in the torque is observed when the supply amplitude increases and as long as the motor has not reached magnetic saturation.

In the first embodiment of motor system according to the invention shown in FIG. 1, devices 10 for measuring rotor frequency FRT1, FRT2 of each of the rotors R1, R2 have been provided. These measuring devices 10 supply to a measurement-signal processing unit 4 a first signal MFR1 representing the rotor frequency FRT1 of first motor M1 and a signal MFR2 representing the rotor frequency FRT2 of second motor M2.

The central electric supply 2 and processing unit 4 are connected to a control device 6. Processing unit 4 is arranged to supply at an output 4a a signal SFMX representing the maximum rotor frequency between the rotor frequency FRT1 of first motor M1 and the rotor frequency FRT2 of second motor M2. Signal SFMX is applied to an input of control device 6 constituted by input 11a of an adder 11. The control device 6 is arranged to apply to a first input 12 of central electric supply 2 a first signal SCF for controlling the supply frequency FAL and to apply to a second input 14 of central supply 2 a second signal SCA for controlling the supply amplitude UAL.

Control device 6 comprises a unit 20 for producing a regulation signal SRG, issued from an output 20a of unit 20. An input 20b of unit 20 is connected to a device 22 for measuring the principal supply current IAL which supplies to it a measurement signal SMI of the principal electric supply current. Another input 20c of unit 20 is connected to an instruction unit 24 which supplies an instruction signal SCS thereto. Unit 20 for producing regulation signal SRG is arranged to produce this regulation signal SRG in dependence upon the signal SMI and SCS input into this unit.

Regulation signal SRG is applied to an input 30a of a unit 30 for regulating the difference in the frequency of rotation between the stator frequency FST and the maximum rotor frequency FRM, and to the input 32a of a unit 32 for producing an amplification coefficient CAP, issued from an output 32b of unit 32.

Figure 3:
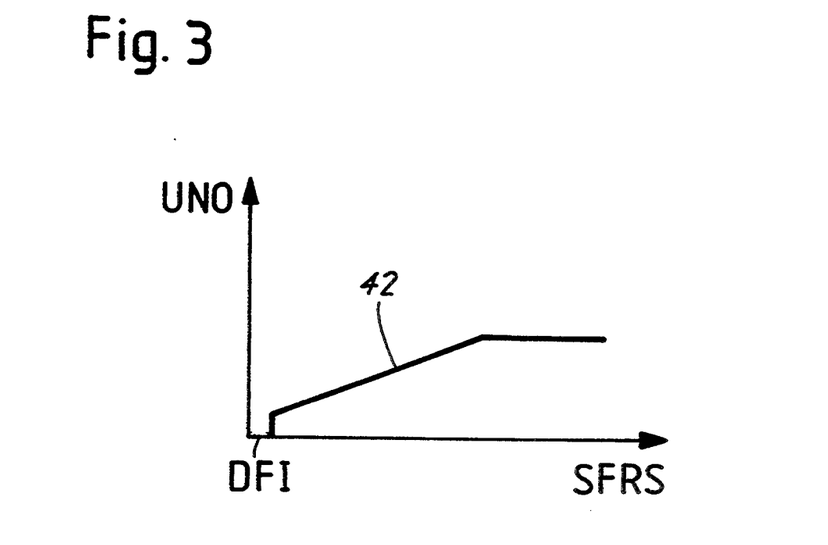
FIG. 3 schematically shows a characteristic defining a normalized amplitude of the voltage as a function of a signal representing a resulting frequency determining a supply frequency.

Unit 30 supplies at an output 30b a signal DVA representing a variable frequency-difference, this signal DVA being applied to an input 11b of adder 11. An input 11c of adder 11 is connected to a unit 36 for producing a signal DFI representing a fixed-frequency difference. Adder 11 adds the signals SFMX, DVA and DFI applied to its inputs 11a, 11b, and 11c and supplies at its output 11d a signal SFRS corresponding to a resulting frequency. Signal SFRS serves to form the first control signal SCF of supply frequency FAL. Then, signal SFRS issuing from output 11d of adder 11 is applied to an input 40a of a unit 40 wherein a normalized voltage-frequency curve 42, schematically represented in FIG. 3, is memorized. Unit 40 is arranged to supply at its output 40b a normalized voltage amplitude UNO in dependence upon signal SFRS applied to its input 40a.

Signal UNO from unit 40 and signal CAP from unit 42 are respectively applied to an input 42a and an input 42b of a unit 42 wherein these two signals CAP and UNO are multiplied. The result of this multiplication issues from the output 42c of unit 42 to form the second control signal SCA of supply amplitude UAL.

It will be noted that an amplifier 46 is provided in the electric path 48 connecting adder 11 to supply 2 in the case where the number of pairs of poles of the stator windings B1, B2, which are identical, is other than 1. If the number of pairs of poles of stator windings B1 and B2 is given by the variable P, the synchronous frequency of rotation of the rotor is reduced by a factor 1/P, which is thus equivalent to a motor having a single pair of magnetic poles and a stator frequency FST=FAL/P.

Figure 2:
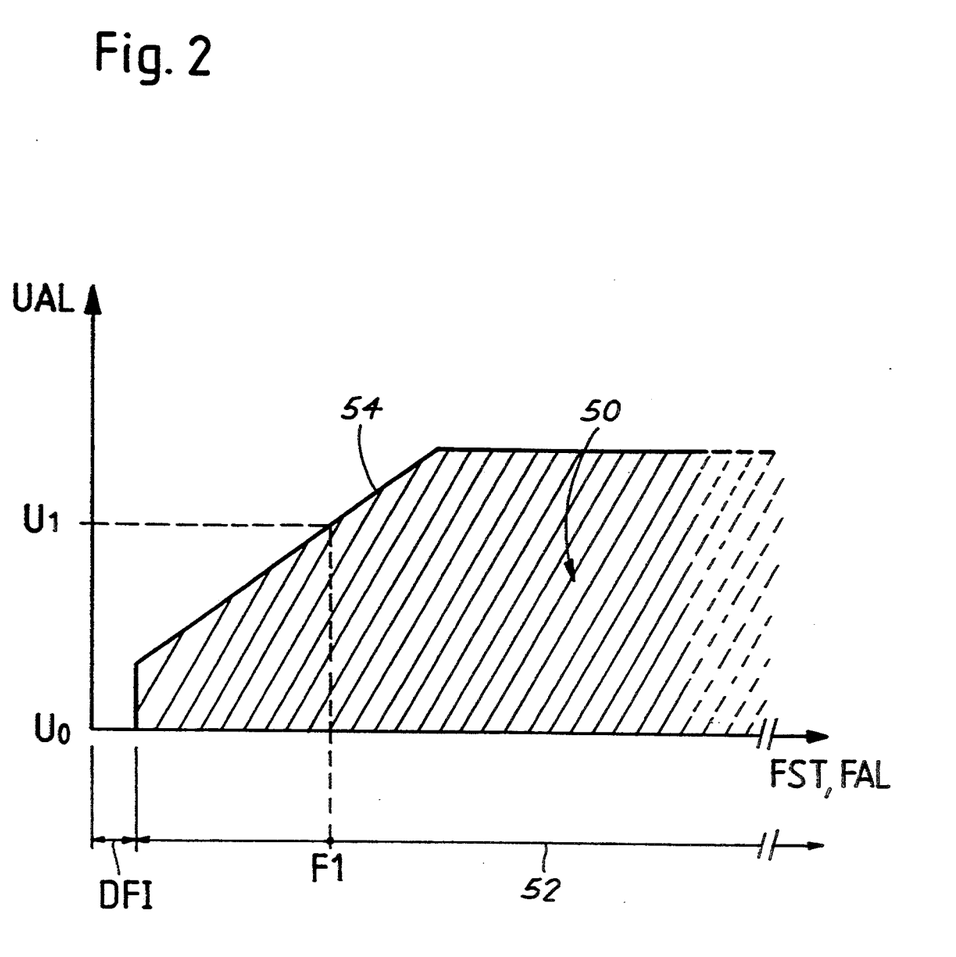
FIG. 2 schematically shows a supply domain of the asynchronous electric motors included in the first embodiment of motor system according to the invention.

FIG. 2 defines a supply voltage domain 50 of the motors M1, M2 supplied by central electric supply 2. The supply voltage domain 50 is represented by a graph giving the supply amplitude UAL of the supply voltage as a function of stator frequency FST, the value of the latter being a whole number multiple of the value of supply frequency FAL of the supply voltage. The values that can be taken by stator frequency FST together define a range 52 of frequency values that the stator frequency FST can have.

For each frequency value F1 comprised in the range 52 of values, the supply amplitude UAL is able to vary between a minimum value U0 and a maximum value U1, these values being defined in a specific manner for each frequency F1 of said range 52. The maximum values U1 together define a voltage limit curve 54.

The control device 6 of the motor system according to the invention is so arranged that, firstly, the stator frequency FST, whose value is defined by the value of the resulting frequency FRS, is equal to the sum of the maximum rotor frequency FMX and the fixed frequency difference DFI as long as the supply amplitude UAL of the supply voltage has a value less than the maximum value U1 for this stator frequency FST, which corresponds to a zero value for the variable frequency difference DVA and, secondly, the variable frequency-difference DVA is able to have a value greater than zero when the supply voltage amplitude UAL is equal to a maximum value U1 along the voltage limit curve 54.

Figure 4:
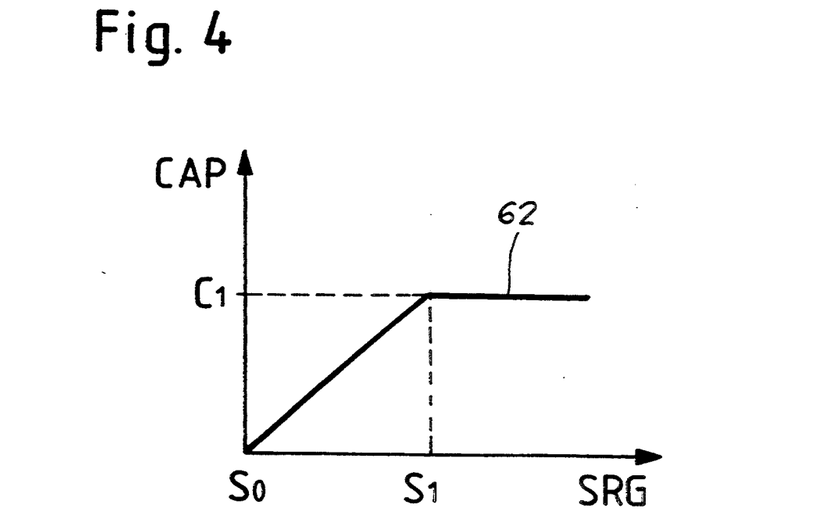
FIG. 4 schematically shows a characteristic defining a coefficient of amplification of the normalized voltage-amplitude as a function of a regulation signal.
Figure 5:
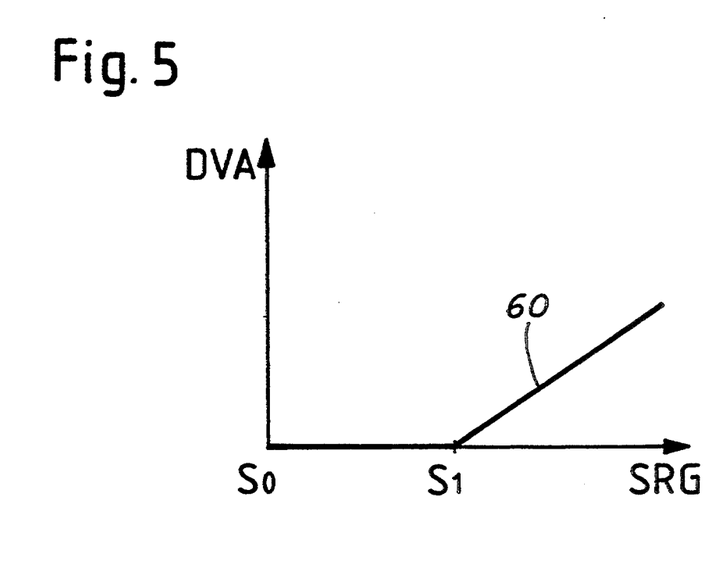
FIG. 5 schematically shows a characteristic defining a variable rotation frequency difference between a turning stator magnetic field and a maximum rotor frequency, as a function of a regulation signal in the case of the first embodiment of the invention.

The above-described supply principle is achieved in particular by means of the transfer function of unit 30, defined by curve 60 schematically shown in FIG. 5, the transfer function of unit 40 defined by the normalized voltage-frequency curve 42 schematically shown in FIG. 3 and the transfer function of unit 32 defined by the characteristic curve 62 schematically shown in FIG. 4.

In FIGS. 4 and 5, it can be observed that the value of the variable frequency-difference DVA is fixed at zero as long as regulation signal SRG is below a given value S1. Moreover, the amplification coefficient CAP increases in a substantially linear manner in dependence upon the regulation signal SRG between an initial value S0 and value S1. It is however possible to arrange that the variable frequency-difference DVA increases slightly in dependence upon regulation signal SRG between the values S0 and S1.

For value S1, the amplification coefficient CAP reaches its maximum value C1. When regulation signal SRG is greater than S1, the amplification coefficient is maintained at the maximum value C1. This coefficient C1 is determined such that the normalized voltage-frequency curve 42 of FIG. 3 multiplied by said coefficient C1 gives the voltage limit curve 54 schematically shown in FIG. 2, this voltage limit curve 54 being predetermined depending on the characteristics and dimensions of the used asynchronous motors.

Also, when regulation signal SRG is greater than S1, the variable frequency-difference DVA takes values greater than zero as shown in FIG. 5. The variable frequency-difference DVA is greater than zero when regulation signal SRG is greater than S1 for a drive mode PPS of the motor system and increases substantially linearly with regulation signal SRG.

Thus, as long as regulation signal SRG is below value S1, the resulting frequency FRS, forming the first control signal SCF of supply frequency FAL, corresponds substantially to the maximum rotor frequency FMX to which has been added a predetermined fixed frequency-difference DFI corresponding to almost optimum operating conditions over almost the entire supply domain 50 of the used asynchronous motors.

It is noted that it is also possible to slightly and progressively increase the frequency difference between the values S0 and S1 of regulation signal SRG to ensure absolute optimum working conditions over the entire supply domain 50.

Also, according to the value given to regulation signal SRG between the initial value S0 and value S1, the second control signal SCA of supply amplitude UAL applied by unit 42 to central electric supply 2 is able to vary, for each value of the resulting frequency FRS, between a minimum value U1 and a maximum value U2 along the voltage limit curve 54. Moreover, when regulation signal SRG has a value greater than value S1, the difference of frequency between stator frequency FST and the maximum rotor frequency FMX is increased, and the value of signal DVA representing a variable frequency-difference then increases significantly.

It will be noted that, advantageously, the variable frequency-difference DVA is held constant when it has reached a predetermined maximum value. In other words, from a given value of the regulation signal, an increase of this regulation signal no longer generates an increase in the variable frequency-difference DVA.

When the value of regulation signal SRG is greater than value S1, the coefficient of amplification CAP maintains a constant value C1. As a result, the second control signal SCA of the supply amplitude UAL of supply voltage corresponds to a value of the voltage limit curve 54, whatever may be the value of the resulting frequency FRS.

In summary, the supply amplitude UAL of the supply voltage increases, for a given maximum frequency of rotation FMX, between minimum value U0 and maximum value U1, which is predetermined for the stator frequency FST equal to said maximum rotor frequency FMX to which is added an optimal, fixed, frequency-difference DFI, when the regulation signal increases between the initial value S0 and value S1. Then, supposing the maximum rotor frequency FMX remains constant and the value of the regulation signal continues to increase above value S1, the difference of rotation frequency between stator frequency FST and maximum rotor frequency FMX increases significantly, which corresponds to an increase in the motors' slip, and the supply amplitude UAL of the supply voltage with which central electric supply 2 supplies motors M1 and M2 takes the maximum possible value for the resulting frequency FRS or, respectively, the first control signal SCF of stator frequency FST resulting from the increase of the frequency difference.

Figure 6:
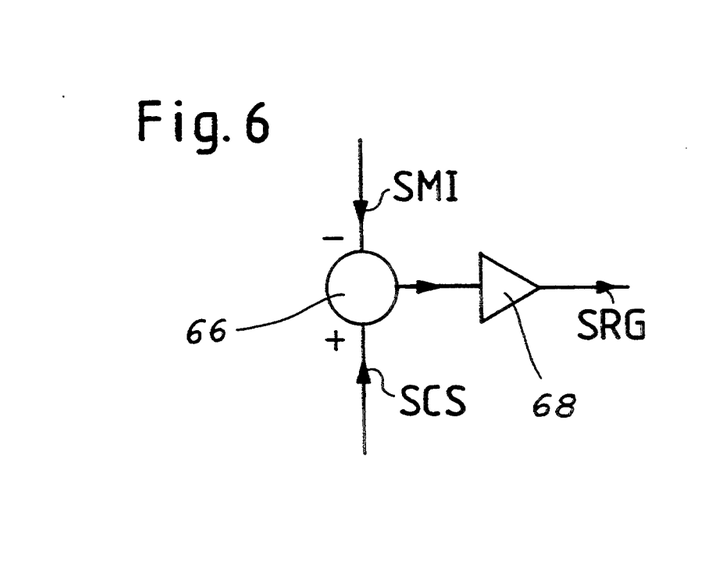
FIG. 6 represents an embodiment of a regulation signal production unit for the first embodiment of the invention.

A form of the unit 20 producing regulation signal SRG is shown in FIG. 6. In this Figure, it is noted that the instruction signal SCS and the measuring signal SMI of the principal current supply IAL are subtracted from one another by means of a differentiator 66. The result of this differentiation is then applied to proportional plus integral regulator 68° The signal issuing from regulator 68, notably a voltage signal, then constitutes the regulation signal SRG.

It will thus become apparent that the first embodiment of motor system for an electric type vehicle, described in FIGS. 1 to 6, enables the total torque supplied by the asynchronous motors to said vehicle to be regulated by means of the measurement of the principal electric supply current IAL, of the instruction unit 24 and of the arrangement of unit 20 serving to produce regulation signal SRG. By varying the value of the instruction signal SCS, control device 6 reacts such that the value of signal SMI corresponding to the principal supply current takes a value equal to the value of instruction signal SCS.

Next, the motor system according to this first embodiment of the invention provides for each of the asynchronous motors an operating mode corresponding to a drive mode, the value of the first control signal SCF of the value of the supply frequency FAL being set so that the latter is always greater than the value of the maximum rotor frequency FMX. In the specific case where the value of rotor frequency FRT1 of first motor M1 is equal to the value of rotor frequency FRT2 of motor M2, the two motors are supplied with a supply voltage whose supply amplitude UAL and supply frequency FAL are set so as to have a very good efficiency over the entire operating domain of these motors, and also so as to permit flexible high-performance use of the motors.

It should be noted here that it is possible in a modified form of this first embodiment to have a specific electric supply for each of the two motors M1 and M2, each of these supplies being adjusted as regards their supply frequency by the first control signal SCF and as regards the supply amplitude by the second control signal SCA. In this particular case, the device 22 for measuring the principal electric supply current IAL is replaced by an equivalent device directly measuring the currents IM1 and IM2 each supplying the two motors M1 and M2, the current-measuring signal SMI then corresponding to the sum of the two measured currents IM1 and IM2.

Figure 7:
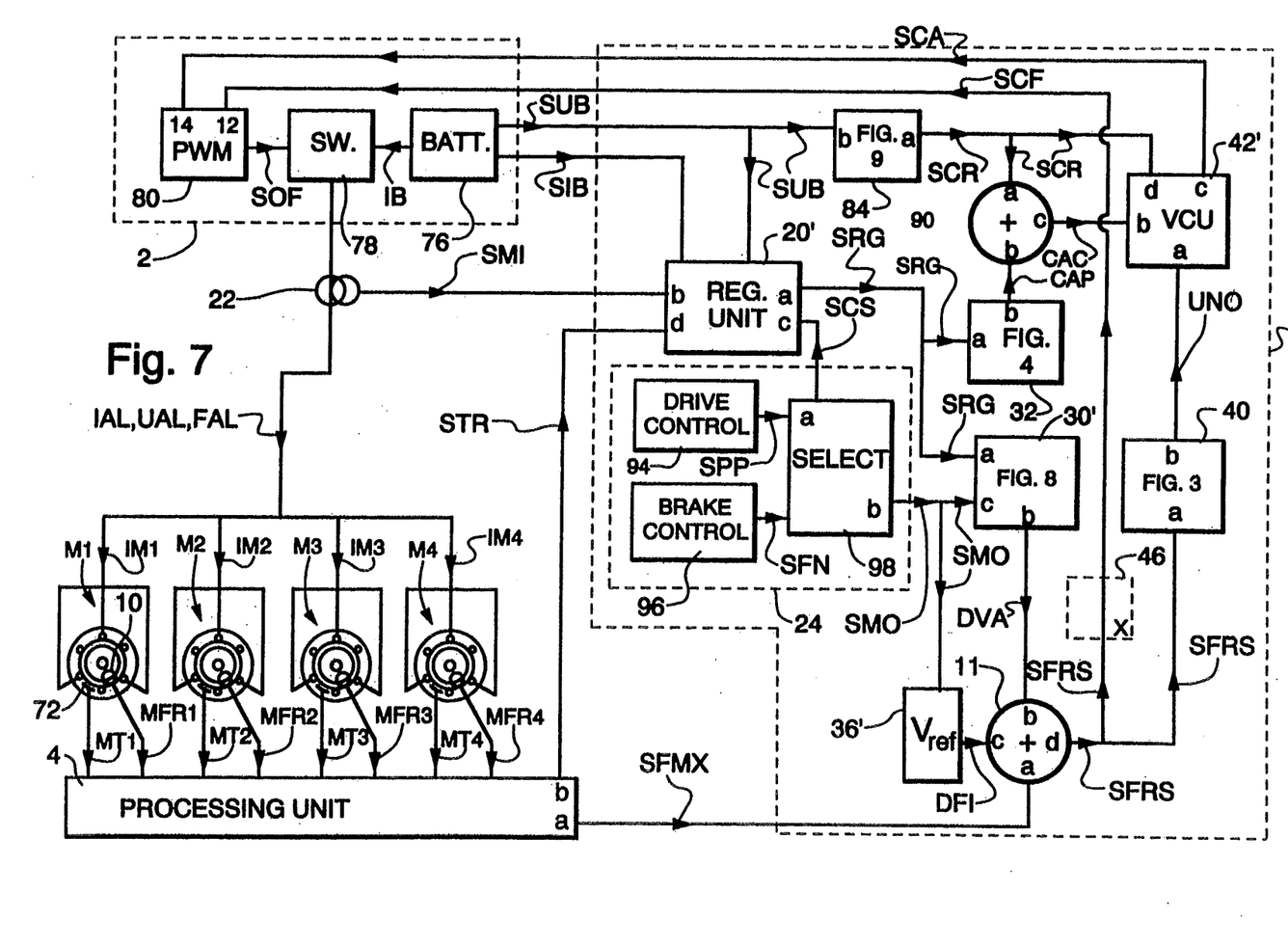
FIG. 7 schematically shows a second embodiment of motor system according to the invention.
Figure 8:
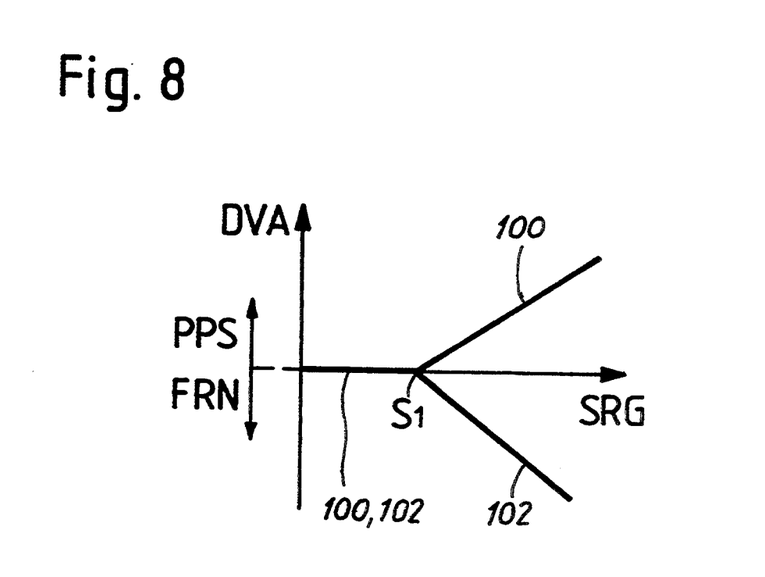
FIG. 8 schematically shows two characteristics defining a variable rotation frequency difference between the turning stator magnetic field and the maximum rotor frequency, as a function of a regulation signal in the case of the second embodiment of the invention.
Figure 9:
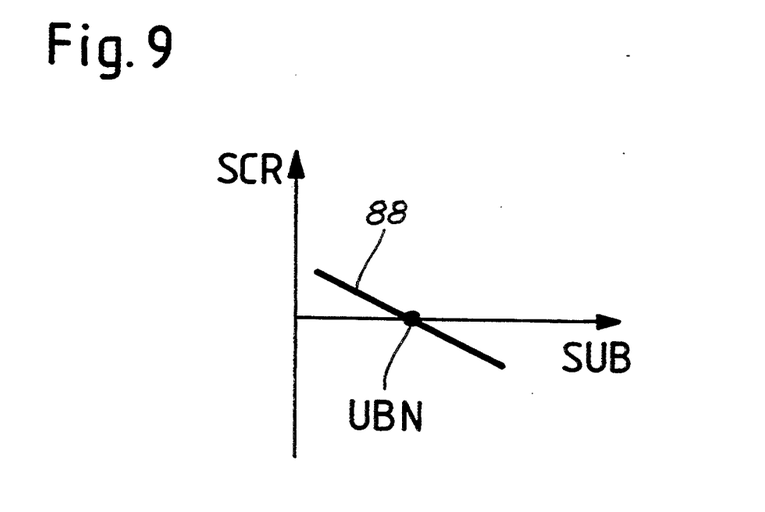
FIG. 9 schematically shows a characteristic giving a signal for correcting a signal for controlling the supply amplitude of the supply voltage as a function of the voltage level of a battery used as energy source.

With reference to FIGS. 7 to 9, a second embodiment of motor system according to the invention will now be described.

Parts designated by the references cited above in the description of the first embodiment of motor system according to the invention will not be described again in detail. Only new units and elements, or those which have been modified relative to the first embodiment of the invention will be described hereinafter.

The motor system of an electric vehicle according to this second embodiment comprises four motors M1, M2, M3 and M4 each supplied in parallel by the central electric supply 2, each motor being supplied by its own AC supply current IM1, IM2, IM3 and IM4. It will be noted that the four motors shown in FIG. 7 are substantially similar to the motors M1, M2 described in the first embodiment according to the invention shown in FIG. 1.

First measuring means 10 (only one of these means being referenced) supply measuring signals MFR1, MFR2, MFR3 and MFR4, each of these signals respectively representing the rotor frequency of one of the four asynchronous motors. In this particular case, the signal SFMX supplied at output 4a of processing unit 4 represents the maximum rotor frequency of the four motors described here. In general, it will be noted that, whatever may be the number of motors in the motor system according to the invention, the signal supplied at output 4a of processing unit 4 corresponds to the maximum motor frequency of all the motors.

Second measuring means 72 for measuring the temperature of each of motors M1 to M4 (only one of these means being referenced) supply to processing unit 4 measuring signals MT1, MT2, MT3 and MT4 corresponding to the value of the temperature of the respective motors. Processing unit 4 issues at an output 4b a signal STR whose value depends on the temperature values measured by second measuring means 72. Signal STR is applied to an input 20d of unit 20. This unit 20 for producing regulation signal SRG is arranged to produce this regulation signal SRG in dependence on instruction signal SCS, on signal SMI from the measurement of the principal electric supply current IAL, and on signal STR, the latter providing information about the temperature of the motors.

As in the first embodiment according to the invention, the value of principal supply current IAL is adjusted in dependence upon instruction signal SCS, the signal STR representing the temperature of the motors serving as a parameter for correction or limitation of instruction signal SCS. It is noted here that is it also possible in a modified form of this second embodiment of the invention to produce a regulation signal in the same way as with the first embodiment of the invention, the value of this regulation signal then being adapted in dependence upon the value of signal STR.

The principal electric supply 2 is formed by a battery 76, power switch device 78 comprising, insulated gate bipolar transistors (IGBT) and a pulse width modulator (PWM) 80.

The first and second control signals SCF and SCA are respectively applied to inputs 12 and 14 of pulse width modulator 80. In response to signals SCF and SCA, modulator 80 applies to power switch 78 an open and close signal SOF which controls the opening and closing of the different switches making up this power switch device. Battery 76 supplies a battery current IB to the power switch device 78 at a voltage UB. The various elements of central electric supply 2 described here thus enable the supply amplitude UAL and supply frequency FAL to be controlled independently.

Battery 76 applies to unit 20 and to a control unit 84 a signal SUB representing the battery voltage. Battery 76 also applies to unit 20 a signal SIB representing the battery current IB supplied to power switch device 78.

It will be noted that the battery current IB serves to provide the principal supply current IAL issuing from power switch device 78. Control unit 84 has a transfer function corresponding to that defined by the characteristic curve 88 schematically shown in FIG. 9. This FIG. 9 shows a correction signal SCR issuing from output 84a of unit 84 in dependence upon signal SUB representing the voltage of battery 76 applied to input 84b of unit 84. It will be noted that the correction value is zero when the battery voltage is equal to the nominal voltage UBN of the battery.

Signal SCR is then applied to an input 42'd of unit 42 producing the second control signal SCA of supply amplitude UAL, and to an input 90a of an adder 90, a second input 90b of this adder being connected to unit 32 which applies thereto a signal representing an amplification coefficient as described with reference to FIG. 4. The result of the addition made by adder 90 is applied to an output 90c and defines a corrected amplification coefficient signal CAC. This signal CAC is then applied to the input 42'b of unit 42'. Unit 42' is arranged to carry out a multiplication between the input 42'a and input 42'b, i.e. of the normalized voltage amplitude signal UNO, as defined in FIG. 3, by the corrected amplification coefficient signal, then to add the result of this multiplication to the value of signal SCR applied to input 42'd of unit 42'. The final result obtained is applied to output 42'c and forms the second control signal SCA for controlling the supply amplitude UAL.

Instruction unit 24 here comprises a drive control 94 and a braking control 96. Drive control 94 supplies a drive signal SPP to a selection device 98. The braking control supplies a braking signal SFN to selection device 98. This device 98 is arranged so that at its output 98a it supplies an instruction signal SCS corresponding to the value of drive signal SPP when the value of braking signal SFN corresponds to a non-braking value of the motor system of this second embodiment of the invention. However, unit 98 is arranged so that the instruction signal SCS it supplies to unit 20' corresponds to the value of the braking signal SFN when the latter has a value other than a non-braking value. It will thus be seen that braking control 96 takes precedence over drive control 94.

Selection device 98 supplies at an output 98b a mode signal SMO that is applied to an input 30'c of unit 30' and to unit 36'. This mode signal SMO specifies to units 30' and 36' the activated mode of the motor, namely whether the drive mode PPS or the braking mode FRN is activated. The drive mode is activated when instruction signal SCS corresponds to drive signal SPP. Likewise, the braking mode is activated when instruction signal SCS corresponds to braking signal SFN.

When the drive mode PPS is activated, the fixed frequency-difference DFI memorized in unit 36' takes a positive value. However, when the braking mode FRN is activated, the value of fixed frequency-difference DFI is negative. In a preferred form of this second embodiment, the absolute value of the fixed frequency-difference DFI is identical for the two possible modes of the motor.

Likewise, unit 30' is arranged so that, when drive mode PPS is activated, the variable frequency-difference DVA defined by the characteristic curve 100 of FIG. 8 takes a positive value when regulation signal SRG has a value greater than value S1. However, when the braking mode FRN is activated, unit 30' is arranged to switch to the characteristic curve 102 schematically shown in FIG. 8, the resulting variable frequency-difference DVA in this case being negative when the value of regulation signal SRG is greater than S1. Again, in the preferred form of this second embodiment, the absolute value of the variable frequency-difference DVA for a given regulation signal SRG is identical for the two modes of the motor.

Thus, in the preferred form of this second embodiment, a symmetry of operation is observed between the drive mode PPS and the braking mode FRN. This operating symmetry results in an optimum efficiency both in the drive mode and in the braking mode.

It will also be seen that the instruction signal SCS is arranged to have the same mathematical sign for the two possible modes of the motor. In this second embodiment according of the invention, the mathematical sign of the value of instruction signal SCS is positive. Likewise, the mathematical sign of regulation signal SRG supplied by unit 20' is positive in both modes of the motor in this second embodiment of the motor system according to the invention. This particular arrangement has the advantage that it permits regulation of the drive mode PPS and of the braking mode FRN by means of the same measuring signal SMI of the principal supply current IAL supplied by the common measuring device 22 of this principal supply current IAL.

The above-described particular characteristic is derived from the observation of the fact that the principal supply current IAL has, both in the drive mode PPS and in the braking mode FRN, an identical absolute value for a total torque exerted on the shafts of the fours motors M1 to M4 of this second embodiment of the invention. This is explained by the fact that the AC supply current of an asynchronous motor is formed by a magnetization current generating a turning magnetic flux and an active current, in the case where the rotor does not have the same frequency of rotation as the turning magnetic field in the region of the rotor. The magnetization current is dephased by 90° in relation to the AC supply voltage producing this magnetization current. Thus, the magnetization current does not produce any active power. However, the active current is once more dephased by 90° in relation to the magnetization current. Two possible cases are thus distinguished, one corresponding to the drive mode PPS and the other to braking mode FRN.

In the drive mode, the active current is in phase with the AC supply voltage. As a result, there is a positive active power corresponding to the power supplied to the motors, of which a part is transformed into mechanical energy driving the vehicle. In the braking mode, the active current is dephased by 180° relative to the AC supply voltage, i.e. its value is negative relative to the active current of the drive mode. In this case, the resulting active power is negative and corresponds to electric power supplied partly to the principal electric supply, this supplied electric power resulting from a transformation of mechanical energy into electrical energy produced by braking, i.e. by negative acceleration of the vehicle equipped with the second embodiment of the motor system.

Hence, the amplitude of the supply current or its intensity remain identical for the same absolute value of the active current, whatever may be the mode of operation of the motor, namely the drive mode or the braking mode. In the second embodiment, this latter property is used to simplify the motor system according to the invention as far as possible. To do this, either the amplitude of the principal supply current IAL, or the rectified mean value of this current is measured. Hence, it is possible to use only the measuring device 22 for the principal supply current IAL and the same unit 20' for producing regulation signal SRG.

For a measured value of the current, there is either a torque supplied by the motor to accelerate the vehicle, or a torque of the same absolute value serving to brake the vehicle according to whether motors M1 to M4 have a positive or negative slip. The only adaptation of the motor system according to the invention to pass from the drive mode PPS to the braking mode FRN thus consists in inverting the sign of the slip, while keeping the same mathematical sign for instruction signal SCS.

It will furthermore be noted that the fact of regulating the supply frequency FAL, which is identical for all of the motors, on the basis of the single signal SFMX representing the maximum rotor frequency of all the motors included in the motor system according to the invention has numerous advantages. The first advantage to be noted resides in the fact that the stator frequency of all the motors, and hence the supply frequency FAL of all the motors, is regulated on the bases of only two signals, namely instruction signal SCS and signal SFMX. Next, the stator frequency of all the motors is regulated on the basis of the same two signals both in the drive mode PPS and in the braking mode FRN.

Moreover, selection of signal SFMX as parameter for regulating the stator frequency FST of all the motors guarantees an adequate and coherent operation of all the motors, both in the drive mode and in the braking mode. Specifically, in the drive mode the motor system according to the invention assures the same driving conditions for each of said motors.

In the case of the braking mode, the motor system according to the invention provides very good braking performances by regulating the stator frequency of all of the motors on the basis of the same parameter defined by signal SFMX corresponding to the maximum rotor frequency of all motors. It is ensured no wheel locking will occur for whatever reason because if one wheel goes out of control during braking, its speed can only diminish and hence the braking torque applied to the respective wheel coupled to this motor drops. As a consequence, the wheel once more adheres and resumes its normal rotating speed, or, in the event of practically zero adherence, its frequency-difference never exceeds the sum of the fixed frequency-difference DFI and of the variable frequency-difference DVA. Such a motor system thus has the advantage of providing a maximum adherence of the wheels to the ground during braking.

It is noted that at the end of braking, the first signal SCF for controlling the supply frequency FAL is of course arranged to correspond at all times to a positive frequency.

Lastly, in a form of this second embodiment of motor system according to the invention with all-wheel drive, it is possible to provide motors of different dimensions at the front and at the rear of the vehicle. In such a case, the characteristics and dimensions of the front motors are adapted to those of the rear motors so that each of the motors appropriately operates in response to the same control device.

It will be noted that, in this form, it is also possible to provide two electric supplies, one for the front motors and the other for the rear motors, these two electric supplies being controlled by the same control device 6. In the latter case, it is possible to amplify the second signal for controlling the supply amplitude between the control device and the electric supply supplying the more powerful motors so that these more powerful motors may have a greater supply amplitude proportional to the supply amplitude of the less powerful motors.

What is claimed is:

1. A motor system for an electric vehicle, said motor system comprising at least two asynchronous electric motors, each asynchronous electric motor being coupled to a respective wheel of said vehicle and comprising:

a stator winding for producing a magnetic field turning at a stator frequency in response to an AC supply current supplied to said stator winding by electric supply means at an AC voltage defining a supply frequency;

a rotor magnetically coupled to said stator winding, said rotor rotating at a rotor frequency whose value depends on the value of said turning magnetic field; said rotor frequency of each of said motors being measured by first measuring means and supplied to electronic measuring-signal processing means forming part of said motor system; said electronic processing means issuing at a first output, connected to a first input of a control device, a frequency signal which represents, among said measured rotor frequencies, the maximum rotor frequency; said control device supplying to said electric supply means a first control in response to said frequency signal applied to said control device, said first control signal determining, for each of said motors, a common value for said supply frequency; said value of said supply frequency defining for said stator frequency of each of said motors a common resulting value; and said control device being controlled so that said resulting value is greater than the value of said frequency signal having served to regulate said resulting value when said motor system is activated in a drive mode.

2. A motor system according to claim 1, wherein said control device is arranged so that said resulting value of the stator frequency is less than the value of said frequency signal having served to regulate said resulting value when a braking mode is activated in said motor system.

3. A motor system according to claim 1, wherein said electric supply means comprise means for producing said supply voltage for each of said motors with a supply amplitude determined by the value of a second control signal supplied by said control device.

4. A motor system according to claim 1, wherein said electric vehicle comprises two front wheels and two rear wheels, said electric vehicle comprising two asynchronous electric motors coupled respectively to the two front wheels or to the two rear wheels.

5. A motor system according to claim 1, wherein said electric vehicle comprises two front wheels and two rear wheels, said electric vehicle comprising two asynchronous electric motors coupled respectively to said two front wheels and two asynchronous electric motors coupled respectively to said two rear wheels.

6. A motor system according to claim 5, wherein said two asynchronous electric motors coupled respectively to said two front wheels have different dimensions from said two asynchronous electric motors coupled respectively to said two rear wheels so that the power delivered by said two asynchronous electric motors coupled to said two front wheels is different from the power delivered by said two asynchronous electric motors coupled to said two rear wheels.

7. A motor system according to claim 5, wherein said supply means of said asynchronous electric motors form a common central electric supply supplying said asynchronous electric motors in parallel with a principal AC supply current.

8. A motor system according to claim 3, wherein said first control signal is applied to a first input of said electric supply means by first regulation means forming part of said control device for regulating said supply frequency; said second control signal being applied to a second input of said electric supply means by second regulation means also forming part of said control device for regulating said supply amplitude; said first and second regulation means being arranged so that, for each value of said stator frequency, said supply amplitude is able to vary in dependence upon a regulation signal between a minimum value and a maximum value defined for each value of said stator frequency; said maximum values together defining a voltage limit curve, said supply frequency being adjusted so that, for each value of said stator frequency, the rotation frequency-difference between said stator frequency and said maximum rotor frequency is maintained substantially constant as long as said supply amplitude has a value less than said defined maximum value for each value of the stator frequency; said first and second regulation means being arranged so that the absolute value of said frequency difference can be increased in dependence upon said regulation signal when, for any value of the stator frequency; and said supply amplitude has a value equal to said defined maximum value for said value of the stator frequency.

9. A motor system according to claim 8, wherein said first regulation means comprise;
- a first unit for supplying a signal representing a fixed frequency difference;
- a second unit for regulating said rotation frequency-difference between said stator frequency and said maximum rotor frequency and issuing at an output of said second unit a signal representing a variable frequency-difference in response to said regulation signal applied to a first input of said second unit by a third unit forming part of said control device for producing said regulation signal;
- an adder having inputs connected to said electronic means for processing the measuring signals and to said first and second units; said adder having an output connected to said first input of said electric supply means and to said regulation means for regulating the supply amplitude of the supply voltage; said adder adding said frequency signal representing said maximum rotor frequency to said signal representing said fixed frequency-difference and to said signal representing said variable frequency-difference to issue at its output a signal representing a resulting frequency which serves to produce said first control signal.

10. A motor system according to claim 9, wherein an amplifier is provided in an electric path connecting said adder to said electric supply means, said amplifier multiplying said signal representing said resulting frequency by a factor corresponding to a number of pairs of poles provided for each of said stator windings of said asynchronous electric motors.

11. A motor system according to claim 9, wherein said second regulation means of said supply amplitude of said supply voltage comprise:
- a fourth unit having an input connected to the output of said adder and in which is memorized a normalized voltage-frequency curve enabling a signal representing a normalized voltage amplitude to be produced and supplied at an output of said fourth unit in dependence upon said signal representing said resulting frequency from said adder;
- a fifth unit having an input connected to said third unit enabling an amplification coefficient to be produced and supplied at an output of said fifth unit in response to said regulation signal supplied by said third unit;
- a sixth unit, having inputs connected respectively to said fourth and fifth units and having an output connected to said second input of said electric supply means enabling a multiplication to be carried out between said signal representing said normalized voltage amplitude from the fourth unit and said amplification coefficient from the fifth unit, the result of said multiplication serving to define said second control signal transmitted to said second input of said electric supply means.

12. A motor system according to claim 9, wherein said third unit for producing said regulation signal has a first input connected to a device for measuring the sum of said AC supply currents supplying said motors; said measuring device supplying a signal representing a measurement of said sum of said AC supply currents; a second input connected to an instruction unit which supplies thereto an instruction signal; and said third unit comprising means for producing said regulation signal in response to said instruction signal and said measuring signal.

13. A motor system according to claim 12, wherein said instruction unit comprises a drive control for producing a drive signal and a braking control for producing a braking signal; said instruction unit comprising a selection device connected to said drive control and to said braking control; said selection device having a first output connected to a second input of said third unit and a second output connected to a second input of said second unit, and to said first unit; said selection device comprising means for supplying at its first output said instruction signal with a value corresponding to that of said drive signal when said braking signal has a non-braking value and to said braking signal when the value of the latter is different from said non-braking value; and said selection device supplying at its second output a mode signal having a first value corresponding to said drive mode when said instruction signal corresponds to said drive signal and having a second value corresponding to said braking mode when said instruction signal corresponds to said braking signal.

14. A motor system according to claim 13, wherein said first and second units are respectively arranged so that said fixed frequency difference and said variable frequency-difference are respectively positive when said mode signal defines a drive mode and negative when said mode signal defines a braking mode.

15. A motor system according to claim 9, wherein second means for measuring the temperature of at least one of said asynchronous electric motors are provided; and a signal representing the measured temperature being supplied to said third unit for producing the regulation signal and serving to form the value of said regulation signal.

16. A motor system according to claim 1, wherein said electric supply means comprise at least one battery connected to a pulse width modulator, the latter also being connected to power switching means, said first and second inputs of said electric supply means forming part of said pulse width modulator.

* * * * *

UNITED STATES PATENT AND TRADEMARK OFFICE
CERTIFICATE OF CORRECTION

PATENT NO. : 5,432,418
DATED : July 11, 1995
INVENTOR(S) : Rene Jeanneret

It is certified that error appears in the above-indentified patent and that said Letters Patent is hereby corrected as shown below:

On title page, item [22] Foreign Application Priority Data", add -- July 29, 1992 [FR] France 9209506 --.

Column 14, line 32, after "first control" insert -- signal --.

Signed and Sealed this

Tenth Day of October, 1995

Attest:

BRUCE LEHMAN

Attesting Officer    Commissioner of Patents and Trademarks